Oct. 18, 1949.  E. B. NOEL  2,485,404
MULTIPLE FLASH LAMP DEVICE
Filed April 12, 1944  2 Sheets-Sheet 1
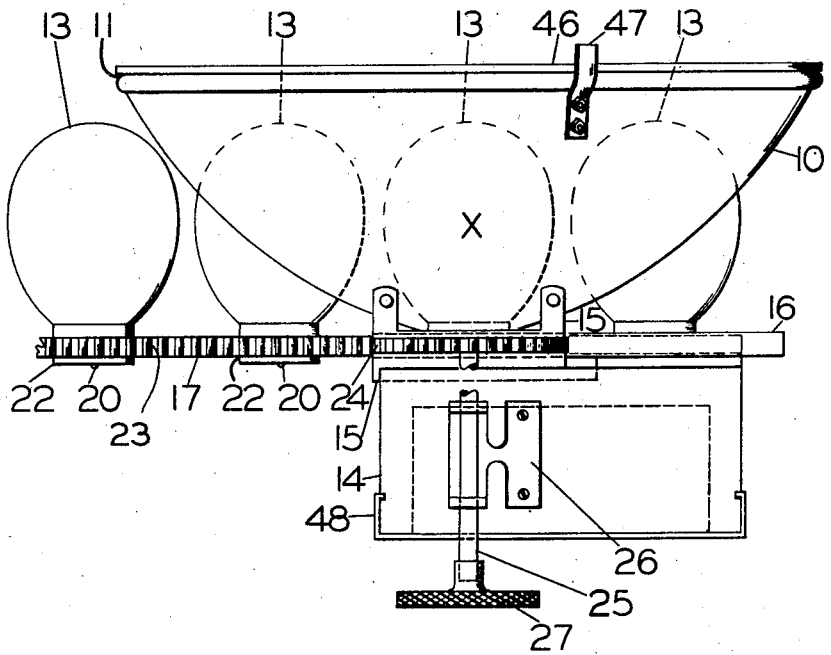
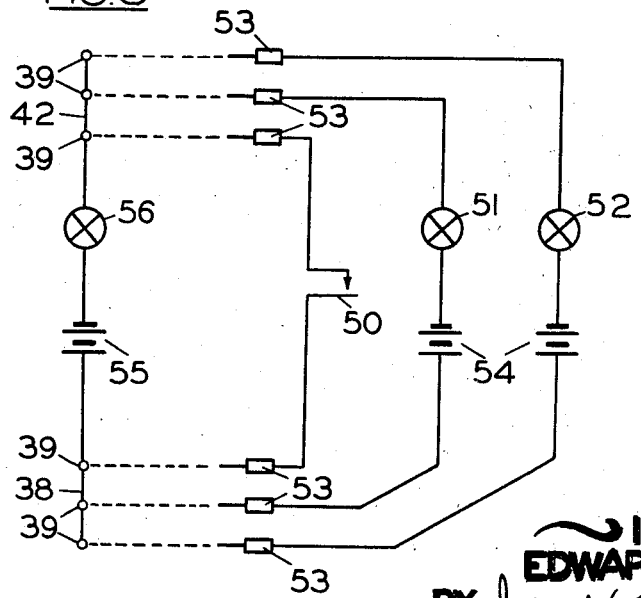
INVENTOR:
EDWARD B. NOEL,
BY John J Henderson
HIS ATTORNEY.

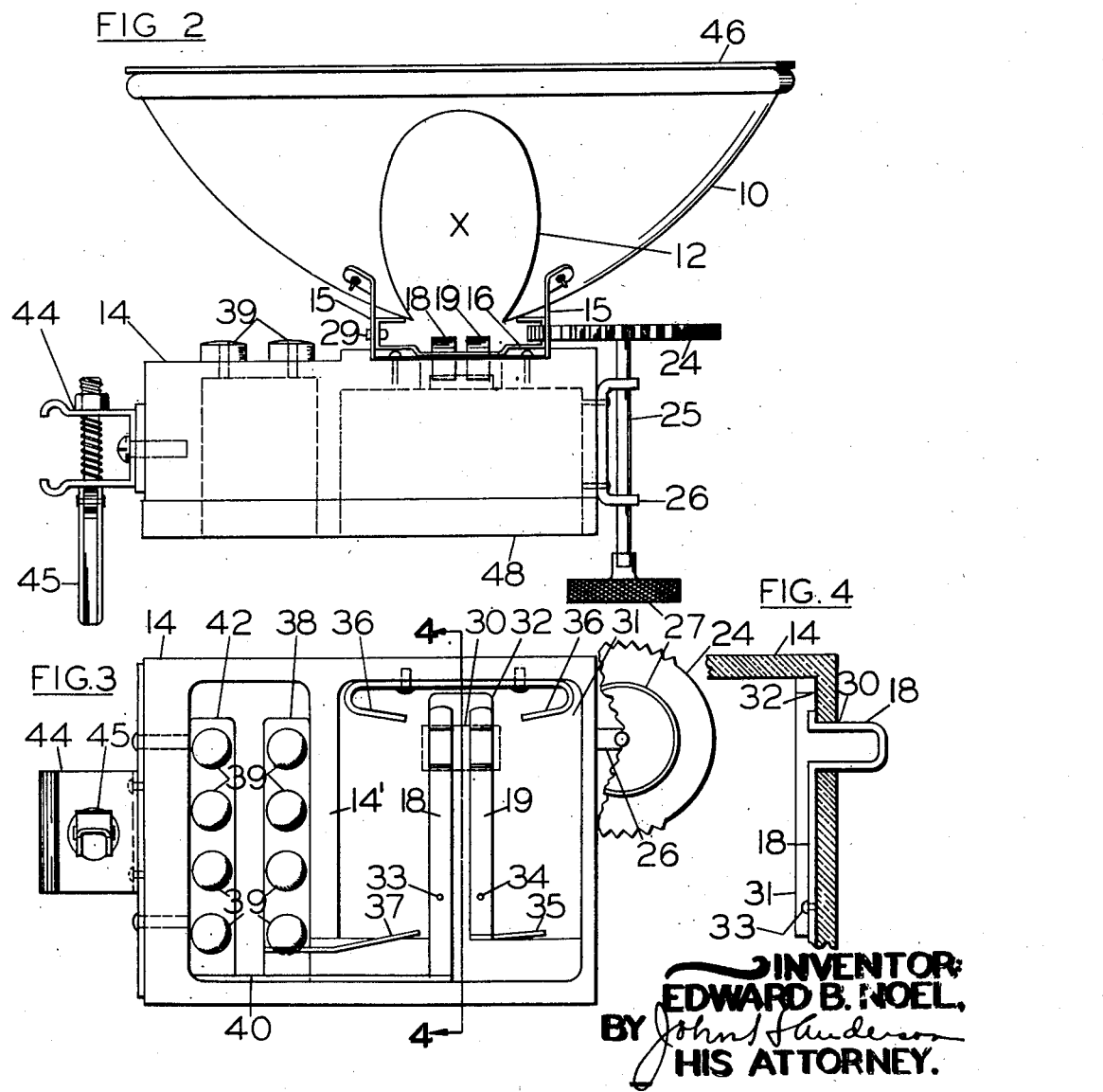

Patented Oct. 18, 1949

2,485,404

UNITED STATES PATENT OFFICE 2,485,404

MULTIPLE FLASH LAMP DEVICE

Edward B. Noel, Cleveland Heights, Ohio, assignor to General Electric Company, a corporation of New York Application April 12, 1944, Serial No. 530,668

5 Claims. (Cl. 240—37)

1

My invention relates to illuminating apparatus for photographic purposes and its principal object is to provide a compact illuminating apparatus or device of this kind accommodating a plurality of flash lamps and capable of emitting a number of flashes of light in rapid succession to enable a photographer to take a series of pictures in a short time. Further objects and advantages of the invention will appear from the following description of species thereof and from the appended claims.

In the drawing accompanying and forming part of this specification an embodiment of my invention is shown in which Fig. 1 is a side elevational view of my multiflash device; Fig. 2 is a top or plan view of the device shown in Fig. 1; Fig. 3 is an elevational view of the back of the battery case with the cover removed; Fig. 4 is a sectional fragmentary view of part of the battery case and taken along the line 4—4 of Fig. 3; Fig. 5 is a front elevational view of a strip of lamps useable in the apparatus of Figs. 1 to 4 and Fig. 6 is a wiring diagram illustrating the electrical connections for the apparatus. Referring to Figs. 1 and 2 of the drawing, my multiple flash lamp device comprises a concave reflector 10, such as a parabolic reflector, having an open mouth 11 at its front through which light may be projected and having part of its sides and back cut out, as shown at 12 in Fig. 2, so that flash lamps 13 may be moved completely through the reflector 10 transversely to the reflector axis for replacing a flashed lamp by an unflashed lamp.

The reflector 10 is attached to and spaced from a battery box 14 by a support 15 to which is also attached a slide 16. The latter is disposed between the reflector 10 and the battery box 14 and accommodates and guides a flash lamp holder which is a stiff strip 17. As the lamp holding strip 17 is moved along the slide 16 the flash lamps 13 are moved into and out of the reflector 10 through the cut-out portion 12 and are brought successively into the position in which the reflector focus, indicated by an X in Figs. 1 and 2, is within the space defined by the lamp envelope. The lamp 13 at the reflector focus is connected across a pair of resilient contact fingers 18 and 19 which protrude from the battery box 14 a sufficient distance toward the reflector 10 to engage a pair of contacts 20 and 21 (Figs. 1 and 5) on the bottom of base 22 of the lamp 13 held by the strip 17 and the slide 16 at the reflector focus X.

Ignition of the lamp 13 is controlled by a conventional manually or automatically operable

2 switch included in the circuit which also includes the contacts 18 and 19 and a current source suitable for igniting the lamps 13. Thus, the lamps may be moved quickly and successively into and out of the focus X of the reflector 10 for ignition so that device may produce flashes of actinic light in rapid succession for photographic purposes.

The lamp holding strip 17, shown in Figs. 1 and 5, is in the form of a rack having a row of teeth 23 along one long side or edge for engaging with a toothed wheel or pinion 24 attached to axle 25 supported by and rotatable in bracket 26 attached to the battery box 14. The pinion 24 passes through an opening in one side of the slide 16 (Fig. 2) for engaging with the teeth 23 on the strip 17. The pinion 24 may be turned manually by wheel 27 to move the strip 17 in the slide 16 to bring successive lamps to the reflector focus. The other long edge of the strip 17 is provided with a plurality of spaced notches 28 (Fig. 5) which engage with a pawl 29 (Fig. 2) extending through an opening in the side of the slide 16 opposite to that accommodating the pinion 24. The notches 28 are so spaced along the strip 17 that when the pawl 29 engages therewith a lamp 13 is indexed and releasably held at the reflector focus X. Thus, the strip 17 may be moved step-by-step along the slide 16 by the pinion 24 and releasably held between movements by the pawl 29 in a position in which a lamp 13 is at the reflector focus and connected across the circuit contacts 18 and 19 for ignition.

The circuit contacts 18 and 19 are in the form of elongated spring fingers (Fig. 3) disposed in the battery box 14 and have a bent or curving portion which extends through an opening 30 in the wall of the battery box 14 to the outside of the box (Figs. 2 and 4). The wall of the box 14 having the opening is partially covered by a thin plate 31 which is shaped as shown (Figs. 3 and 4) to provide a groove or slot 32 accommodating the spaced contacts 18 and 19 which are bolted at 33 and 34, respectively, to the wall of the box along the slot 32 to prevent relative displacements of the contacts 18 and 19 which abut against the sides of the slot 32.

The contact 19 has an upstanding resilient portion 35 (Fig. 2) at the end more remote from its bent portion for engaging with one terminal of a battery of conventional flashlight cells (not shown) in the box 14. The cells are clamped between and connected in series by the said contact portion 35, a resilient bridging member 36 bolted to the top of the box 14, which consists of electrically insulating material, such as an organic plastic, and another contact portion 37 which is integral with a contact strip 38 having a plurality of contact buttons or sockets 39 secured thereto. The other contact 18 has a portion 40 which extends along the bottom wall of the box 14 and is attached to a contact strip 42 having a row of similar contact buttons or sockets 39 secured thereto. The contact sockets 39 extend through the front wall of the box 14 (Fig. 2). The terminals of the switch for controlling ignition of the lamps are connected into a pair of sockets 39, one socket on each of the strips 38 and 42 as shown in Fig. 6, the switch being represented at 50. The other sockets 39 on the strips 38 and 42 are provided for connecting other flash lamps in parallel for simultaneous ignition with that in the focus X of reflector 10 in the well known manner. Such other lamps may be spaced from the device and are represented at 51 and 52 of Fig. 6. As shown in the diagram each of the lamps 51 and 52 may be connected to a pair of sockets 39, one socket on each of the strips 38 and 42, by current lead wires and plugs 53. A separate battery 54 may be provided for supplying ignition current for each of the lamps 51 and 52. The batteries 54 are connected so as to buck the voltage produced by the battery 55 mounted in the box 14 of the apparatus and which supplies the ignition current for the flash lamp 56 at the reflector focus and connected across the contacts 18 and 19 (Fig. 2). The sockets 39 on the strip 38 may be of a different color than those of the strip 42 and the plugs 53 may have corresponding colors to ensure the connection of the batteries 54 with the proper polarity with respect to the battery 55. Closing the contacts of switch 50 causes all the lamps 51, 52 and 56 to flash simultaneously.

The box 14 has a strengthening rib or partition 14' which prevents or limits lateral movement of the battery of cells in the box 14. As shown, the partition terminates short of the bottom wall of the box 14 to provide space for the contact portions 37 and 40.

The flash lamps 13 shown in elevation in Fig. 1 and the bases 22 of which are shown in plan in Fig. 5 are of the type disclosed and claimed in the copending Fulton and Foote application Serial No. 461,578, filed October 10, 1942, issued as Patent No. 2,424,446 on July 22, 1947, and assigned to the assignee of this application. The lamps of the copending application and shown in Figs. 1 and 5 of my application have an electrically insulating, hollow, circular base 22 which constitutes part of the envelope wall, supports a pair of current inleads and has a pair of contacts 20 and 21 on the bottom thereof for engaging the circuit contacts 18 and 19. The contacts 20 and 21 are bent over portions of the inlead wires. The base, the neck of the envelope and the inleads of the lamp are joined together by a plastic gum which hermetically seals the joints therebetween. A bead of fulminating or combustible material, such as that disclosed in the Pipkin Patent #2,291,983, issued August 4, 1942, is supported on the inner end of each of the inleads which are bridged by an incandescible filament in contact with the beads to serve as an igniter therefor. The bulb may be filled with a combustion supporting atmosphere, such as oxygen or air at atmospheric pressure or less. The interior of the lamps 13 has been omitted from the drawing for the purpose of simplicity.

The lamp holding strip 17 has a row of spaced, round perforations or apertures therein for accommodating the lamp bases 22 which are held therein by countersunk set screws 43 (Fig. 5). A plurality of lamps 13 may be mounted on the strip 17 and introduced simultaneously into the multiple flash lamp device to eliminate individual handling of the lamps when taking pictures and to enable a photographer to take a number of pictures in a short time. After the lamps 13 have been flashed as described above they may be removed from the strip 17 by loosening the set-screws 43 and unflashed lamps may then be mounted on the strip.

The lamps 13 are disposed in the holding strip 17 with the contacts 20 and 21 disposed transversely to the length of strip 17. As shown in Fig. 5 the contacts 20 and 21 are located eccentrically on the lamp base 22 with the contact 20 slightly more eccentric than the contact 21. In mounting a plurality of lamps 13 in the strip 17 the more eccentric contact 21 of each of the lamps 13 may be disposed on either side of the longitudinal center line of the strip 17. The circuit contacts 18 and 19 are located symmetrically one either side of the said center line of strip 17 when the latter is in slide 16 and are of sufficient width to engage the lamp contacts in either position of said lamp contacts in strip 17. The lamp holding strip is claimed in my application 578,220 filed February 16, 1945, now abandoned, which is a continuation-in-part of this application.

The multiple flash lamp device has a spring clamp 44 having handle 45 and attached to the box 14 for releasably holding the device on a camera in the conventional manner. The box 14 has a back cover 48 which may be slid on and off, passing by clamp 44. The mouth 11 of the reflector 10 may be covered by a conventional light filter or screen 46 removably held by spring clips 47 bolted to reflector 10.

Other types of lamp holders may be used in the apparatus with no or very slight modification of the slide. For example the strip lamp holders disclosed in my copending applications Serial No. 530,667, now Patent No. 2,415,902, issued February 18, 1947, and assigned to the assignee of the present application, and Serial No. 530,666 of even date herewith may be used with the multiple flash lamp device of this application. The lamp holding strips of my copending applications are stiff and are made up of spring metal having folded-over longitudinal edge portions and clamp the lamp base to hold it against forces tending to rotate or longitudinally displace the base.

The combustible material in the lamps may comprise shredded foil which is loosely arranged in the bulb as disclosed in Patent No. 2,351,290, issued June 13, 1944. Conventional bayonet type lamp bases may be used and the circuit contacts 18 and 19 may be modified to engage with said bases without departing from the invention.

The pinion 24 may be omitted from the multiple flash lamp device and the strip 17 moved along the slide 16 for changing lamps in reflector 10 by pushing directly on the strip 17 by hand.

What I claim as new and desire to secure by Letters Patent of the United States is:

1. A multiple flash lamp device comprising a battery box, a concave light-concentrating reflector having an opening in its sides and back so that a flash lamp may be moved transversely of its axis and completely therethrough, means on said box rigidly supporting said reflector thereon and in spaced relation thereto with its said opening directed toward said box, said support means being open to provide with said reflector opening a passage completely through said device, a slide positioned in said passage to guide a flash lamp carrying strip therethrough and to direct the lamps on said strip through said reflector opening, and electrical contacts mounted in said passage adjacent the extension of the reflector axis for engagement with contacts of a flash lamp located at the reflector focus.

2. A multiple flash lamp device comprising a battery box, a concave light-concentrating reflector having an opening in its sides and back so that a flash lamp may be moved transversely of its axis and completely therethrough, means on said box rigidly supporting said reflector thereon and in spaced relation thereto with its said opening directed toward said box, said support means being open to provide with said reflector opening a passage completely through said device, a slide positioned in said passage to guide a flash lamp carrying strip therethrough and to direct the lamps on said strip through said reflector opening, electrical contacts mounted in said passage adjacent the extension of the reflector axis for engagement with contacts of a flash lamp located at the reflector focus, and means in said passage for engaging said strip to hold a lamp at the reflector focus.

3. A multiple flash lamp device comprising a battery box, a concave light-concentrating reflector having an opening in its sides and back so that a flash lamp may be moved transversely of its axis and completely therethrough, means on said box rigidly supporting said reflector thereon and in spaced relation thereto with its said opening directed toward said box, said support means being open to provide with said reflector opening a passage completely through said device, a slide positioned in said passage to guide a flash lamp carrying strip therethrough and to direct the lamps on said strip through said reflector opening, electrical contacts mounted in said passage adjacent the extension of the reflector axis for engagement with contacts of a flash lamp located at the reflector focus, and means extending into said passage for advancing the strip therein to move successive lamps into and out of the reflector focus.

4. In combination, an elongated strip having a row of openings along its longitudinal center portion for accommodating a plurality of flash lamps and having also means for holding said lamps in said openings with their contacts exposed for engagement with contacts of a circuit for flashing the lamps, and a multiple flash lamp device comprising a battery box, a concave light-concentrating reflector having an opening in its sides and back so that a flash lamp may be moved transversely of its axis and completely therethrough, means on said box rigidly supporting said reflector thereon and in spaced relation thereto with its said opening directed toward said box, said support means being open to provide with said reflector opening a passage completely through said device, a slide positioned in said passage and engaging said strip to guide it through said passage and to direct the lamps on said strip through said reflector opening, and electrical contacts mounted in said passage adjacent the extension of the reflector axis for engagement with contacts of a flash lamp located at the reflector focus.

5. In combination, an elongated strip having a row of openings along its longitudinal center portion for accommodating a plurality of flash lamps and having also means for holding said lamps in said openings with their contacts exposed for engagement with contacts of a circuit for flashing the lamps, one longitudinal edge of said strip being provided with teeth and the other with notches in predetermined relation to said openings, and a multiple flash lamp device comprising a battery box, a concave light-concentrating reflector having an opening in its sides and back so that a flash lamp may be moved transversely of its axis and completely therethrough, means on said box rigidly supporting said reflector thereon and in spaced relation thereto with its opening directed toward said box, said support means being open to provide with said reflector opening a passage completely through said device, a slide positioned in said passage and engaging said strip to guide it through said passage and to direct the lamps on said strip through said reflector opening, a pawl mounted on said reflector support and engaging said notches to hold said strip with a lamp at the reflector focus, a manually turnable pinion gear extending into said passage and engaging the teeth on said strip to move said strip along said passage to change the lamp at the reflector focus, and electrical contacts mounted in said passage adjacent the extension of the reflector axis for engagement with contacts of a flash lamp located at the reflector focus.

EDWARD B. NOEL.

REFERENCES CITED

The following references are of record in the file of this patent:

UNITED STATES PATENTS

| Number | Name | Date |
| --- | --- | --- |
| 1,369,967 | Davis | Mar. 1, 1921 |
| 1,481,731 | Ogier | Jan. 22, 1924 |
| 1,923,270 | Lawrence | Aug. 22, 1933 |
| 1,955,616 | Wallace | Apr. 17, 1934 |
| 2,122,416 | Freeman | July 5, 1938 |
| 2,244,114 | Noir | June 3, 1941 |
| 2,258,575 | MacKay | Oct. 7, 1941 |
| 2,275,987 | Packer | Mar. 10, 1942 |
| 2,330,673 | Braum | Sept. 28, 1943 |